No. 845,192. PATENTED FEB. 26, 1907.
B. PÉDUCASSE.
COMBINED BRAKING AND LOCKING DEVICE.
APPLICATION FILED SEPT. 15, 1906.
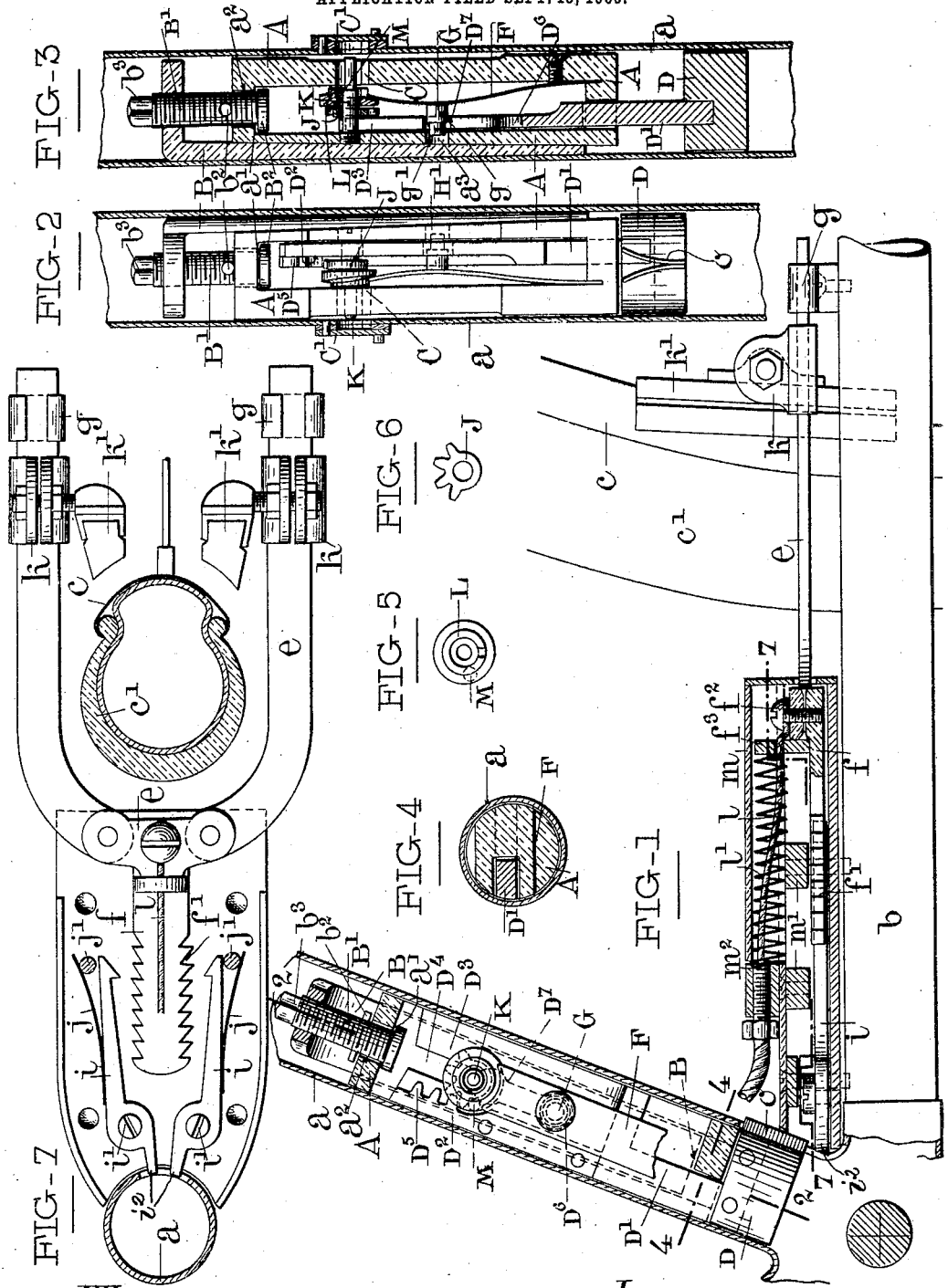
Witnesses:
Jean Germain
Guillaume Pioche
Inventor:
Bernard Péducasse

UNITED STATES PATENT OFFICE.

BERNARD PÉDUCASSE, OF LYON, FRANCE.

COMBINED BRAKING AND LOCKING DEVICE.

No. 845,192.          Specification of Letters Patent.          Patented Feb. 26, 1907.

Application filed September 15, 1906. Serial No. 334,742.

*To all whom it may concern:*

Be it known that I, BERNARD PÉDUCASSE, a citizen of the Republic of France, residing at Lyon, France, have invented certain new and useful Improvements in a Combined Braking and Locking Device, of which the following is a specification.

This invention relates to an improved combined brake and locking device for vehicles and the like, and has for its object the provision of braking means which may be operated to retard movement of the vehicle and also mechanism whereby said braking means may be set to serve as a lock or anchorage for the vehicle.

The invention will be more fully described in connection with the accompanying drawings and will be more fully pointed out and ascertained in and by the appended claims.

In the drawings, Figure 1 is a view in side elevation of a portion of a frame of a vehicle or bicycle and the device of my invention applied thereto, showing parts thereof in section. Fig. 2 is a sectional view on line 2 2 of Fig. 1, showing internal mechanism in elevation. Fig. 3 is a similar view showing parts in section and reversed with respect to the position shown in Fig. 2. Fig. 4 is a horizontal section on line 4 4 of Fig. 1. Figs. 5 and 6 are views in elevation of detached parts of mechanism embodying my invention. Fig. 7 is a horizontal sectional view on line 7 7 of Fig. 1.

Like parts are designated by similar characters of reference throughout the different figures of the drawings.

As shown, the frame of the vehicle or bicycle to which the device of my invention is applied is of tubular construction, and there is shown a portion of one horizontal member $b$ and an angularly-disposed upright member $a$. The wheel $c'$ is of the pneumatic type and is provided with a rim $c$.

Next describing the braking mechanism in detail, the same consists of a bifurcated member $e$, slidably mounted at its forward ends in guides $g$, secured to any stationary part—such, for instance, as the horizontal frame member $b$. The opposite end of said bifurcated member is connected with a ratchet-bar $f$, inclosed in a casing $m$, secured to the horizontal member $b$. Said ratchet-bar $f$ is maintained in a substantially central position in the casing $m$ by suitable guides $m'$. A cable $l$ or the like is connected with the bifurcated member and said ratchet-bar at $f^2$ and extends outside the casing to a point in convenient access to the operator. A spring $l'$, preferably encircling said cable, is interposed between a stationary part $m^2$ of the casing and a member $f^3$, carried by said bar $f$, and serves to maintain said bar and the bifurcated member $e$ in a normal or forward position, as shown in Fig. 1. At its forward end said bifurcated member is provided with clips $k$, carrying brake-shoes $k'$, adapted to be brought into engagement with the rim $c$.

It will be obvious from the foregoing that when the cable $l$ is pulled rearwardly the resulting rearward motion of the bifurcated member $e$ against the action of spring $l'$ will force the brake-shoes $k'$ into engagement with the rim $c$, thereby retarding movement of the vehicle.

I will now describe the device whereby the brake-shoes may be locked in engagement with the braking-surface $c$. There is provided a pair of pawls $i$, pivoted at $i'$ upon the lower wall of the casing $m$ in a manner to engage the oppositely-disposed teeth $f'$ of the bar $f$. Said pawls are normally held in an inoperative position by springs $j$, secured at their inner ends to the pawls $i$ and engaging at their outer free ends pins $j'$, secured to the bottom wall of the casing $m$. The inner ends of said pawls are provided with operating extensions $i^2$, adapted to project into the upright frame members $a$. When the projections $i^2$ are spread apart, the pawls $i$ are brought into engagement with the ratchet-bar $f$, locking the same in a retracted position.

The means for locking the pawls $i$ in engagement with the ratchet-bar $f$ consists of the following construction: A hollow frame A of a generally circular cross-section is adjustably secured in the upright $a$ by means of a wedge B, interposed between a flattened portion of said frame A and the inner wall of the upright. The flattened portion of said frame A conforms to the shape of the wedge B, so that as the parts are moved relatively to each other in one direction a tight wedging action is effected and as the parts are moved in an opposite direction the wedging action is released. In order to effect such relative movement, there is provided a bolt B', having threaded engagement with an overhanging bent portion of the wedge B and a loose engagement with the frame A.

Preferably said loose engagement is effected by providing said bolt with a head $B^2$, fitting against a shoulder $a'$, or formed by an aperture $a^2$ in the upper end of the frame A. A pin $b^2$ serves to retain the bolt in its normal position and prevents downward movement of the same. When a key or like implement is applied to the upper squared end $b^3$ of the bolt $B'$, the required wedging or releasing action may be quickly effected.

The frame A is provided with a locking-plunger D, having a locking key or wedge $o$, adapted as the plunger is lowered to enter between the extensions $i^2$ and spread the same, thereby serving to bring the pawls $i$ into engagement with the teeth $f'$ of the bar $f$. Said locking-plunger D is provided with an arm $D'$, which projects upwardly within the frame A and is bifurcated to form engaging members $D^2$ and $D^3$, forming an intermediate space $D^4$. One of said locking members, preferably $D^2$, is provided with a relatively short rack $D^5$. Said locking members $D^2$ and $D^3$ are also provided with two sets of oppositely-disposed recesses $D^6$ and $D^7$. The frame A is provided with a locking-pin G, which, as shown, is yieldingly supported upon a leaf-spring F. The pin G is provided with a relatively enlarged portion $g$, adapted to fit closely in either of said sets of recesses, and a smaller portion $g'$, adapted to fit within an aperture $a^3$, formed in the frame A. A key-pin K is rigidly secured to the frame A and projects between the bifurcated members $D^2$ and $D^3$ into a keyway C. A keyway-closure $C'$ is secured to the exterior of the frame member $a$ and is adapted to be opened and closed during and after the insertion of a suitable key. Loosely mounted upon the pin K is a cam member L and mutilated gear J. The cam member L is provided with a pin M, adapted to engage and operate the gear J. The free end of the spring F bears against the cam portion of the member L, and when the latter is turned in one direction the cam portion serves to retract the spring F and withdraw the pin G from engagement with the recesses $D^6$ or $D^7$, and when the cam member L is turned in an opposite direction the spring F is released and serves to force the pin G into engagement with said recesses to lock arm $D'$ in an upper or lower position.

It will be obvious from the foregoing when the pin G has been withdrawn from the arm $D'$ it will be necessary to raise or lower the latter, as the case may be, to lock or unlock the brake-shoes. In order to effect this operation, the pin M of the cam member L engages the pinion J and serves to rotate the latter in the direction in which the cam member L is rotated, the pinion J engaging the rack $D^5$ and serving to raise or lower the locking-plunger D.

The operation will be obvious from the foregoing, but may be briefly recapitulated as follows: When the operator desires to apply the brakes, the cable $l$ is retracted, drawing the brake-shoes $k'$ into engagement with the rim $c$. If it is desired to set the brakes in locking engagement with the brake-surface and assuming that the locking mechanism is in the position shown in Fig. 2, the operator will insert the key in engagement with the cam member L, turning the latter in a contraclockwise direction. Prior to engagement of the pin M with gear J the cam L will have retracted the spring F, withdrawing the pin G from engagement with the recesses $D^6$, and thereupon the pin M will engage the gear J, and the latter through the rack-teeth $D^5$ will force the plunger D downwardly until the wedge $o$ has spread the extensions $i^2$ and locked the pawls $i$ in engagement with the teeth $f'$. In this position the cam L will have released the spring F, and the latter will force pin G into engagement with the recesses $D^7$, thereby serving to retain the plunger D in its lower or locked position.

It will be obvious that when the parts are assembled the frame A can be readily adjusted in the frame member $a$ in such a position that the plunger D in its downward limit of movement will be in a position to throw the pawls $i$ into a locking position.

I claim—

1. A combined brake and locking device for vehicles and the like comprising in combination, a vehicle-frame, a wheel, brake-shoes, a retaining device for holding said shoes in an engaging position, a locking device coöperating with said retaining device and comprising a locking-plunger, a spring-actuated locking-pin adapted for engagement with said plunger, and a key-actuated cam member and a gear coöperating with said locking pin and plunger.

2. A combined brake and locking device for vehicles and the like comprising in combination, a vehicle-frame, a wheel, brake-shoes adapted for engagement with said wheel and provided with a ratchet-bar, pawls adapted for engagement with said ratchet-bar, a locking-plunger operating said pawls, a spring-actuated locking-pin for retaining said plunger in locking and unlocking positions, and a key-actuated cam and gear for said locking pin and plunger.

In testimony whereof I affix my signature in presence of two witnesses.

BERNARD PÉDUCASSE.

Witnesses:
JEAN GERMAIN,
GUILLAUME PISCHE.